United States Patent Office 3,578,403
Patented May 11, 1971

3,578,403
RECRYSTALLIZATION OF PYROLYTIC BORON NITRIDE
Arthur W. Moore, Parma, Ohio, assignor to Union Carbide Corporation
Filed July 5, 1968, Ser. No. 742,614
Int. Cl. C01b 21/06
U.S. Cl. 23—191     6 Claims

ABSTRACT OF THE DISCLOSURE

A method for structurally transforming pyrolytic boron nitride into a product closely related to a single crystal hexagonal boron nitride structure by subjecting a disc or plate of the starting material to a simultaneous temperature of at least 2250° C. and pressure of 5000 p.s.i. in a non-reactive atmosphere. The pressure is applied uniaxially in the predominant direction of the C-axes and applied so as to place the material in compression.

FIELD OF INVENTION

This invention relates to a method of producing a structurally well defined form of pyrolytic boron nitride.

Pyrolytic boron nitride is generally prepared by the thermal decomposition of boron trichloride and ammonia vapors on a graphite substrate at a temperature of about 1900° C. A complete description of this process is set forth in U.S. Pat. 3,152,006. Pyrolytic boron nitride produced in this manner is characterized by a density of between 2.0–2.2 grams/cubic centimeter and a crystallite size of 50–100 angstroms. The material is further characterized by a high degree of preferred orientation of crystallites and the basal planes tend to be aligned parallel to the substrate surface. The crystallite preferred orientation is defined as the full width at one-half maximum intensity of the X-ray 002 (basal plane) reflection and for this material it measures between 60° and 100°.

While pyrolytic boron nitride has been useful in certain applications, structural modifications of this material to improve certain properties would be most desirable.

SUMMARY OF THE INVENTION

The present invention provides a process whereby a major structural transformation of pyrolytic boron nitride is effected. By subjecting pyrolytic boron nitride to a temperature above 2250° C. and simultaneously applying a uniaxial pressure of between about 5000 pounds per square inch and about 15,000 pounds per square inch in a direction perpendicular to the basal planes, the pyrolytic boron nitride is transformed into a soft, lustrous, transparent material. The end product is characterized by a theoretical density, i.e. 2.28±0.01 grams per cubic centimeter, is highly crystalline and has a crystallite preferred orientation of about 2°. The material is further enhanced by a wall defined solid structure closely related to that of single crystal hexagonal boron nitride. These important properties enable the stress recrystallized pyrolytic boron nitride to be used in microwave devices such as a polarizer or an infrared "window" or even as a monochromator for X-ray reflection.

In the preferred manner of practicing the invention, pieces of pyrolytic boron nitride are machined into discs or plates with substantially parallel upper and lower surfaces. These surfaces are representative of the predominant direction of the basal planes of the crystallites. One or several of the discs are positioned between end plates composed of hot pressed boron nitride and the components are placed in a thick-walled cylinder of the same material. The assembly is placed in a graphite furnace such that uniaxial pressure is transferred to the pyrolytic boron nitride by graphite plungers. The temperature is raised to 2250°–2450° C. and the pressure is then increased to between 3000 and 6000 p.s.i. These conditions are preferably maintained from about ½ to about 5 hours. Upon cooling, the pressure is released to about one-fourth of its maximum value until room temperature is reached and the sample is then removed from the furnace.

Alternatively, one or several discs of pyrolytic boron nitride are placed between two plates of pyrolytic graphite of larger diameter, and the assembly is placed in a graphite die in a graphite hot-pressing furnace. The temperature is raised to 2250–2450° C., then the pressure is increased to between about 5000–15,000 p.s.i. These conditions are also maintained for about ½ to about 5 hours.

DESCRIPTION OF THE DRAWING

The invention will be more fully described with reference to the drawing wherein:

Referring to FIG. 1, a cylindrical induction furnace 10 (indicated as having segments 12, 14 for illustrative purposes) is preferably composed of graphite which acts as a susceptor for the inductive heating means (not shown). Graphite plungers 16, 18 are positioned within the furnace 10 and adjacent the pyrolytic graphite plates 20, 22. A disc 24 of pyrolytic boron nitride is placed between plates 20, 22. In operation of the furnace, pressure is applied along the longitudinal axis of the plungers through the plates 20, 22 to compress the disc 24 while heat is supplied to the disc. The disc is initially positioned such that the majority of the C-axes (the direction perpendicular to the plane of deposit during formation of the pyrolytic boron nitride) of the crystallites are parallel to the direction of the applied force (as indicated by the arrows in FIG. 1). This initial orientation of the specimen must be effected for the structural transformation to be successful. Furthermore, for proper results, the uniaxial pressure should be simultaneously applied to the entire area of the proper surface of the pyrolytic boron nitride, and the pressing device in immediate contact with the boron nitride during processing, such as plates 20, 22, should be larger in diameter than the material being treated so that continued uniaxial pressure can be maintained even during the expansion of the material along the basal plates, i.e. in the direction perpendicular to the applied force.

FIG. 2 illustrates a variation in the equipment which can be used in the process of the invention. As there shown, a prepacked assembly comprising a graphite sleeve 26 which encloses a boron nitride cylinder 28 and graphite plungers 30, 32 is prepared for insertion as a unit into a furnace. The assembly further includes hot pressed boron nitride end plates 34, 36 and a pyrolytic boron nitride disc 38 positioned between the plates. Pressure is applied through the plungers and plates to the pyrolytic boron nitride in the direction indicated by the arrows on the plungers 30, 32. The predominant C-axes direction of the crystallites within the pyrolytic boron nitride being treated is again aligned in the direction of applied pressure as shown by the arrow alignment on the material. The use of the prepacked assembly facilitates handling and cooling operations during the process and minimizes processing time.

Figure 1:
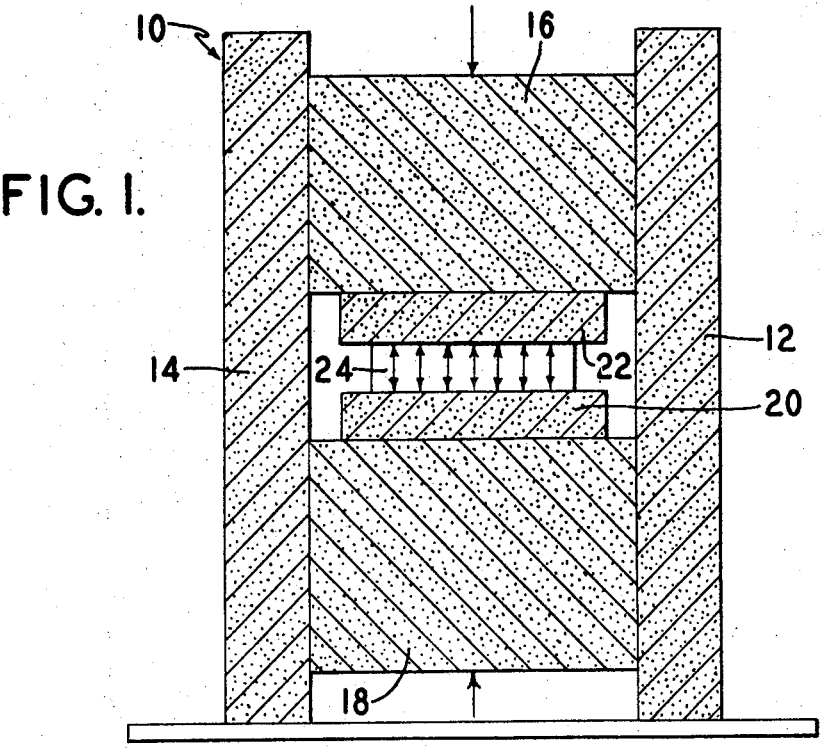
FIG. 1 is a cross sectional view of part of a vertical induction furnace which is useful in the process of the invention.

The pyrolytic boron nitride starting material should be substrate nucleated, it having been determined that continuously renucleated pyrolytic boron nitride does not readily structurally transform when subjected to the aforementioned processing conditions. By substrate nucleated pyrolytic boron nitride is meant material free of co-deposited gas-phase formed particles which act as new nucleation sites. These nucleation sites, apart from representing a structural defect, cause locally misoriented pyrolytic boron nitride regions to form which inhibit the annealing of the whole sample. In addition to this requirement, the starting material should be free of delaminations and of the highest preferred crystallite orientation for best results to be achieved.

mately 9% in diameter. The structural transformation was similar to that in the previous examples while a crystallite preferred orientation of between 2.45° and 2.75° was measured across the sample.

A number of other samples similar to those specified in the examples were processed in equipment similar to that shown in the drawing at pressures between 5000 p.s.i. and 15,000 p.s.i. for ½ to 1 hour. The results of the tests are shown in the following table:

TABLE I

| | Starting material (PBN) | | | End product | | |
|---|---|---|---|---|---|---|
| Batch No. | Density, g./cc. | Temp. (° C.) of deposit and microstructure | Crystalline, preferred orientation, degrees | Density, g./cc. | Crystalline, preferred orientation, degrees | Structural transformation |
| 1 | 2.13–2.13 | 1,875–1,900; ivory color bands, substrate nucleated. | 63 | 2.26 | 3.9 | Transformed at 2,350° C, 8,000 p.s.i. in banded regions. |
| 2 | 2.20–2.20 | 1875–1900; white, continuously renucleated. | 74 | 2.24–2.27 | 13–40 | Resistant to transformation at 2,400° C. and 10,000 p.s.i. |
| 3 | 2.07–2.14 | 1,875–1,900; slightly off white, substrate nucleated. | 60 | 2.28 | 2 | Some samples transformed at 2,400° C., 8,000 p.s.i. |
| 4 | 2.08–2.10 | Cycled 1,825–1,875; white, substrate nucleated, badly delaminated. | 76, 96, 97, 101 | 2.24 | 13–23 | Very little transformation at 2,400° C. and 15,000 p.s.i. |
| 5 | 2.10–2.12 | 1,875–1,900; white substrate nucleated, fine grain. | 61 | 2.27 | 3.7 | Readily transformed at 2,300° C–2,400° C. |
| 6 | 2.03–2.09 | 1,875–1,900; ivory color bands substrate nucleated, coarse grain, delaminated at major cones. | 58, 61, 75, 96 | 2.28 | 1.9 | Do. |
| 7 | 2.11–2.13 | Cycled 1,825–1,875; badly delaminated, banded regions slightly off white. | 94 | No measurements | | None at 2,450° C. |
| 8 | 2.10–2.12 | 1,875–1,900; white, substrate nucleated, delaminated at cones. | 70 | 2.27 | 3.5 | Readily transformed at 2,300° C.–2,400° C., 10,000 p.s.i. |
| 9 | 2.09–2.12 | 1,875–1,900; slightly off white, substrate nucleated, delaminated at cones. | 53, 62, 76 | 2.275 | 2.2 | Readily transformed at 2,350° C.–2,400° C., 7,500 p.s.i. |

The following examples set forth several modes of practicing the method of the invention.

EXAMPLE I

Figure 2:
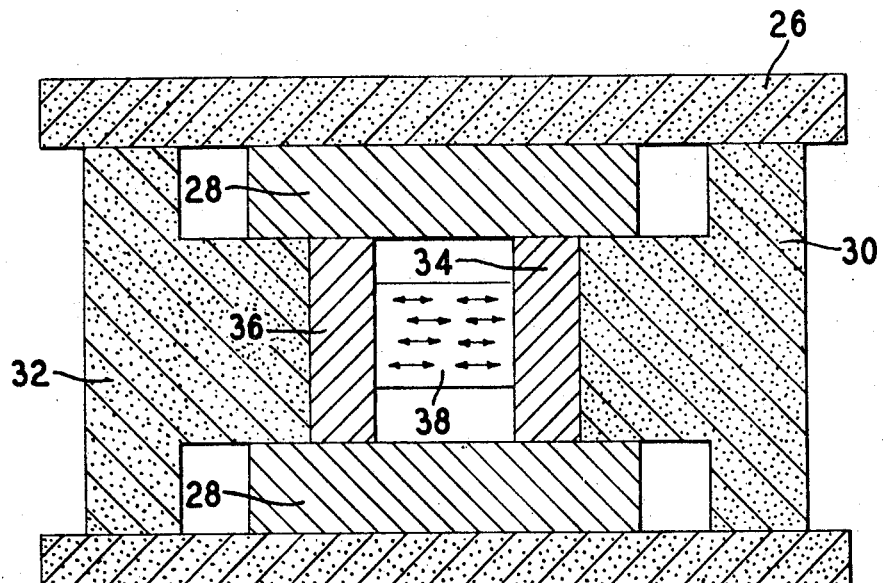
FIG. 2 is another embodiment of furnace equipment which can be used in the process of the invention.

A disc of substrate nucleated pyrolytic boron nitride measuring ⅝ inch in diameter and ⅛ inch thick and having a density of 2.07 grams per cubic centimeter was placed between two hot pressed boron nitride plates which were 1 inch in diameter. A ½ inch thick boron nitride cylinder enclosed the plates and disc as shown in FIG. 2 and the assembly was placed in a furnace with a graphite sleve having a wall thickness of ⅝ inch. The disc was inductively heated to 2400° C. and a uniaxial compressive pressure of 5500 p.s.i. was applied to the disc through graphite plungers in the direction of the C-axes of the crystallites. The simultaneous temperature and pressure were maintained for 1 hour. The material was transformed into a soft, lustrous, transparent, flaky material having a density of 2.28±0.01 grams per cubic centimeter and a crystallite preferred orientation of 2° as compared to 60° in the starting material.

EXAMPLE II

A disc of substrate nucleated pyrolytic boron nitride having a diameter of ¾ inch, a thickness of ¼ inch and a density of 2.08 grams per cubic centimeter was placed between 1 inch diameter pyrolytic graphic plates in a graphite hot pressing furnace. The temperature of the disc was increased to 2325° C. and a uniaxial pressure of 7500 p.s.i. was simultaneously applied for ½ hour. The disc was caused to shrink 22.3% in a direction parallel to the applied force (along the C-axes) and to expand approximately 10% in diameter. The crystallite preferred orientation was 2.1° and the structural transformation was similar to that in Example I.

EXAMPLE III

A substrate nucleated pyrolytic boron nitride disc having a diameter of 1.70 inches, a thickness of ¼ inch and a density of 2.09 grams per cubic centimeter was placed between 3½ inch diameter plates of pyrolytic graphite in a graphite hot pressing furnace and processed at 2300° C. and 10,000 p.s.i. for 45 minutes. The disc was thereby caused to shrink 21.7% in a direction parallel to the applied force (along the C-axes) and to expand approxi- The process of the invention is carried out in a nonreactive atmosphere and could be practiced in an atmosphere free of carbon. Certain refractory borides such as $TiB_2$ and $ZrB_2$ can serve as heating elements and are thermodynamically stable with respect to boron nitride in a nitrogen atmosphere at the temperatures of the process. Heating of the pyrolytic boron nitride could also be effected by radiation such as within a solar furnace. In addition, high pressures of nitrogen could be used to suppress decomposition of the pyrolytic boron nitride and to permit an increase in temperature during processing.

What is claimed is:
1. A method for improving the preferred crystallite orientation of pyrolytic boron nitride comprising the steps of:
    (a) heating said boron nitride in a nonreactive atmosphere to a temperature between about 2250° C. and about 2450° C., wherein the orientation of the boron nitride can be reorientated;
    (b) applying simultaneously a uniaxial pressure between about 3000 pounds per square inch and about 15,000 pounds per square inch to the entire area of at least one of the surfaces of said boron nitride in a direction substantially parallel to the predominant C-axes crystallite orientation;
    (c) continuing the application of said pressure and said heat for a period of time between about ½ and about 5 hours and then
    (d) removing said pressure and said heat from the pyrolytic boron nitride.
2. The method of claim 1 wherein prior to the application of said temperature and pressure there is added the step of smoothing those surfaces of said pyrolytic boron nitride to which said pressure is applied.
3. The method of claim 1 wherein said boron nitride is a plate having substantially parallel upper and lower surfaces to which said pressure is applied.
4. The method of claim 3 wherein said plate has a thickness between about ⅛ inch and about ¼ inch.
5. The method of claim 1 wherein at least two discs of pyrolytic boron nitride are placed between two plates of pyrolytic graphite having a larger diameter than the boron nitrides discs prior to the application of pressure and heat.
6. The method of claim 1 wherein the pressure in step *d* is released to about one-fourth of its maximum value until room temperature is reached.

References Cited

UNITED STATES PATENTS

| | | | |
|---|---|---|---|
| 2,808,314 | 10/1957 | Taylor | 23—191 |
| 3,152,006 | 10/1964 | Basche | 23—191X |
| 3,212,851 | 10/1965 | Bundy et al. | 23—191 |
| 3,212,852 | 10/1965 | Bundy | 23—191 |
| 3,351,690 | 11/1967 | Stover | 23—191X |

OSCAR R. VERTIZ, Primary Examiner

C. B. RODMAN, Assistant Examiner